UNITED STATES PATENT OFFICE 2,893,932
Patented July 7, 1959

2,893,932

PRODUCTION OF METAL ELECTRODEPOSITS

Hermann Haas, Dusseldorf-Holthausen, Alfred Kirstahler, Dusseldorf, Wolfgang Gündel, Dusseldorf-Oberkassel, and Wennemar Strauss, Dusseldorf-Holthausen, Germany, assignors to Dehydag, Deutsche Hydrierwerke G.m.b.H., Dusseldorf, Germany, a corporation of Germany No Drawing. Application October 25, 1955
Serial No. 542,773

Claims priority, application Germany October 30, 1954

11 Claims. (Cl. 204—49)

This invention relates to an improvement in the production of metal electrodeposits, and more particularly to electroplating baths comprising water-soluble organic brighteners which will produce bright, lustrous and non-porous metal deposits.

Electroplating baths have heretofore been modified by the addition of organic compounds in order to produce bright and lustrous metal deposits. While the additives disclosed by the prior art have usually effected some improvement in the character of the electrodeposits, the additives individually are not sufficient to produce commercially desirable deposits, and, in order to produce metal electrodeposits of high luster and free from pores or pits, the additives of the prior art must be used in conjunction with another, and sometimes two or more, supplemental brightening additives.

It is an object of the present invention to produce metal electrodeposits of improved character.

It is another object of the present invention to provide electroplating baths which will produce bright and non-porous metal electrodeposits over a very wide range of current densities.

Another object of this invention is to provide additives for electroplating baths which may advantageously be used as a sole additive or with other additives to produce bright, lustrous and non-porous metal electrodeposits.

Still other objects and advantages of this invention will become apparent to persons skilled in the art as the description thereof proceeds.

We have found that metal electrodeposits of improved quality and appearance are obtained when water-soluble organic compounds having the structural formula $$X-R-Q$$

or their water-soluble salts are added to the electroplating bath. In the structural formula X is a halogen radical or a radical chemically related to halogen, such as a cyanide or a thiocyanate radical, R is a bivalent hydrocarbon radical of the aliphatic, cycloaliphatic or aromatic type, either substituted or unsubstituted, and Q is a water-solubilizing radical other than a sulfonic acid group.

Compounds of this type are often more readily available and cheaper to manufacture than the corresponding compounds wherein the water-solubilizing group is a sulfonic acid radical.

Suitable water-soluble compounds within the scope of the present invention are those having the above structural formula wherein the radical Q is, for example, a sulfuric acid ester group, a phosphoric acid ester group, a phosphonic acid group (—PO(OH)$_2$) or a phosphinic acid group (—PO.R'.OH, wherein R' is hydrogen or a hydrocarbon radical). However, Q may also be another water-solubilizing radical, such as a hydroxyl group, an etheralcohol group, or a polyetheralcohol group, such as in ethyleneoxide addition products, and the like.

The substituents on the hydrocarbon radical R may be alkyl groups, oxy groups, nitro groups or radicals of the type represented by X.

Insofar as the above compounds are acidic, it is preferred to use them as brightening agents in the form of their salts, preferably their alkali metal and ammonium salts.

The following are a few specific examples of the general class of compounds having the structural formula above referred to which we have found to be effective brightening agents in electroplating baths, according to the present invention:

2-bromoethanol sulfate
3-bromopropanol sulfate
2,3-dibromoethanol sulfate
2-bromoethanol phosphate
3-bromobutanol phosphate
3-bromo-2-oxy-propanol phosphate
2,3-dichloro-propanol phosphate
4-bromophenyl phosphate
3-bromophenyl phosphate
4-bromo-2-nitrophenyl phosphate
4,6-dichloro-2-cresyl phosphate
4-bromo-1-naphthyl phosphate
3-bromobenzyl phosphate
Trichloromethane-phosphonic acid
Bromomethane-phosphonic acid
2-bromomethane-phosphonic acid
4-bromobenzene-phosphonic acid
2,4,6-tribromobenzene-phosphonic acid
4-iodobenzene-phosphonic acid
4-bromobenzyl-ω-phosphonic acid 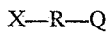
4-bromonaphthalene-phosphonic acid-1
3-thiocyano-phosphinic acid-1
3-cyanopropane-phosphinic acid-1
4-thiocyanobutane-phosphinic acid-1
4-thiocyanobutane-P-methyl-phosphinic acid-1
4-bromobutane-P-phenyl-phosphinic acid-1
Glycerin-monobromohydrin
Pentaerythrite-monobromohydrin
Sorbitol-monoiodohydrin
Ethylene-bromohydrin-diglycol ether
Ethylene-iodohydrin-triglycol ether
2,4-dibromophenyl-polyglycol ethers
and the like.

Compounds of the above type are well known chemicals or can readily be produced by methods used in the manufacture of analogous products.

The above novel brightening agents may be used in conjunction with all types of electroplating processes, but particularly in the production of nickel, copper, bronze and brass deposits. Such brightening agents will produce bright and well-adhering electrodeposits on iron surfaces in acid plating baths, even if the iron surfaces have not been provided with a preliminary copper coating in an alkaline copper cyanide bath. Moreover, the brightening agents herein disclosed may be used in conjunction with other types of brightening agents, with salts which increase the conductivity of the plating bath, with surface-active compounds, and/or with additives which will prevent the formation of pores in the electroplate.

The brightening agents according to the present invention or mixtures thereof are added to the electroplating bath in quantities ranging from about 0.01 to 20 gm./liter, and metal objects are then electroplated therein at temperatures below 60° C. and at current densities between 0.5 and 12 amp./dm.$^2$.

Electroplating baths modified with the brighteners herein disclosed impart exceptionally high brightness and luster to the electrodeposits produced therefrom and also prevent the formation of pores in said electrodeposits. In addition the metal coatings adhere very well to the base surface and are very ductile. Since the brighteners according to the present invention are highly stable in acid solutions and remain practically unconsumed during the electroplating process, and since their range of effective concentration is extremely wide, the baths remain operative for long periods of time, even when operated at relatively high temperatures.

The following examples will further illustrate the present invention and enable others skilled in the art to understand it more completely. We wish it to be understood, however, that our invention is not limited to these examples.

*Example I*

8 gm. bromoethane-sodium phosphonate were added to each liter of a nickel-plating bath composed of water, 200 gm./liter nickel sulfate, 60 gm./liter nickel chloride, and 40 gm./liter boric acid. Thereafter, iron and other metal objects were electroplated in this bath at a current density between 0 and 10 amp./dm.$^2$ and at a temperature between 40 and 60° C. The resulting nickel deposits were very bright and completely free from pores.

Similar advantageous brightening effects were achieved when 16 gm./liter 3-bromopropane-sodium phosphinate of 7 gm./liter 4-iodobutane-potassium phosphinate were added to the above electroplating bath instead of the stated quantity of bromoethane-sodium phosphonate.

*Example II*

8 gm. of the 2-bromoethanol-sodium sulfate are used instead of the bromethane sodium phosphonate in Example I. A valuable nickel deposit is obtained.

*Example III*

6 gm. of the 2,3-dichloropropanol-sodium phosphate are used instead of the bromoethane sodium phosphonate in Example I. A valuable nickel deposit is obtained.

*Example IV*

10 gm. 2-bromoethanol-sodium phosphate were added to each liter of an acid copper-plating bath composed of water, 60 gm./liter sulfuric acid and 170 gm./liter crystalline copper sulfate. Thereafter, sheet steel, which had previously been provided with a preliminary copper plate in an alkaline copper cyanide bath, was electroplated in said bath at a current density between 1 and 10 amp./dm.$^2$ and at room temperature. Even highly profiled pieces were provided with uniform, full-bright, firmly adhering metal coatings which required no further treatment, such as polishing or buffing, after rinsing.

*Example V*

10 gm. of the sodium salt of the bromomethane phosphonic acid is substituted for the 2-bromoethanol-sodium phosphate in Example IV. A valuable copper deposit is obtained.

*Example VI*

8 gm. of the sodium salt of the 4-bromobenzene-phosphonic acid is substituted for the 2-bromoethanol-sodium phosphate in Example IV. A valuable copper deposit is obtained.

*Example VII*

15 gm. trichloromethane-sodium phosphonate were added to each liter of the acid nickel-plating bath described in Example I. Iron objects electroplated in this modified bath at a temperature between 40 and 60° C. and at a current density between 2 and 8 amp./dm.$^2$ were provided with very bright and lustrous nickel coatings which required no polishing.

The same results were obtained when the acid nickel-plating bath was modified with 6 gm./liter ethylene-bromohydrin-triglycol ether or 8 gm./liter 4-bromo-phenyl-sodium phosphate instead of the above-mentioned phosphonate.

*Example VIII*

14 gm. of the glycerine monobromohydrin are used instead of the trichloromethane-sodium phosphonate of Example VII. A valuable nickel plating is obtained.

*Example IX*

14 gm. of the 2,4-dibromophenyl-polyglycol ether are used instead of the trichloromethane-sodium phosphonate of Example VII. A valuable nickel plating is obtained.

*Example X*

10 gm. of the 4,4'-dibromo-diphenyl-sodium phosphate are used instead of the trichloro-methane-sodium phosphonate of Example VII. A valuable nickel plating is obtained.

While we have given certain specific embodiments of our invention, we do not wish to limit the invention to these embodiments. Moreover, it will be evident to persons skilled in the art that various changes and modifications may be made therein without departing from the spirit of the invention or the scope of the appended claims.

We claim:

1. An electroplating bath for producing bright, ductile, non-porous electrodeposits of metals selected from the group consisting of nickel and copper, comprising an acid solution of an inorganic salt of the metal to be deposited and a brightening agent which produces bright, ductile, non-porous metal electrodeposits when used alone in said bath, said brightening agent being selected from the group consisting of organic compounds having the structural formula HAL—R—Q and their water-soluble salts, wherein HAL is a halogen radical, R is a hydrocarbon radical selected from the group consisting of aliphatic, cycloaliphatic and aromatic radicals, and Q is a water-solubilizing radical selected from the group consisting of sulfuric acid ester, phosphoric acid ester, phosphonic acid, phosphinic acid, hydroxyl, ether alcohol and polyether alcohol radicals, said organic compound being dissolved in said bath in sufficient quantity to produce bright metal electrodeposits therefrom.

2. An electroplating bath for producing bright, ductile, non-porous electrodeposits of metals selected from the group consisting of nickel and copper, comprising an acid solution of an inorganic salt of the metal to be deposited, and from 0.01 to 20 grams per liter of a brightening agent which produces bright, ductile, non-porous metal electrodeposits when used alone in said bath, said brightening agent being selected from the group consisting of organic compounds having the structural formula HAL—R—Q and their water-soluble salts, wherein HAL is a halogen radical, R is a hydrocarbon radical selected from the group consisting of aliphatic, cycloaliphatic and aromatic radicals, and Q is a water-solubilizing radical selected from the group consisting of sulfuric acid ester, phosphoric acid ester, phosphonic acid, phosphinic acid, hydroxyl, ether alcohol and polyether alcohol radicals.

3. The process of producing bright, ductile, non-porous electrodeposits of metals selected from the group consisting of nickel and copper, which comprises electrodepositing said metal from an aqueous acid solution containing said metal principally in the form of an inorganic salt, in the presence of a brightening agent which produces bright, ductile, non-porous metal electrodeposits when used alone in said bath, said brightening agent being selected from the group consisting of organic compounds having the structural formula HAL—R—Q and their water-soluble salts, wherein HAL is a halogen radical, R is a hydrocarbon radical selected from the group consisting of aliphatic, cycloaliphatic and aromatic radicals and Q is a water-solubilizing group selected from the group consisting of sulfuric acid ester, phosphoric acid ester, phosphonic acid, phosphinic acid, hydroxyl, ether alcohol and polyether alcohol radicals, said organic compound being dissolved in said bath in sufficient quantity to produce bright metal electrodeposits therefrom.

4. The process of producing bright, ductile, non-porous electrodeposits of metal selected from the group consisting of nickel and copper, which comprises electrodepositing said metal from an aqueous acid solution containing said metal principally in the form of an inorganic salt, in the presence of from 0.01 to 20 grams per liter of a brightening agent which produces bright, ductile, non-porous metal electrodeposits when used alone in said bath, said brightening agent being selected from the group consisting of organic compounds having the structural formula HAL—R—Q and their water-soluble salts, wherein HAL is a halogen radical, R is a hydrocarbon radical selected from the group consisting of aliphatic, cycloaliphatic and aromatic radicals, and Q is a water-solubilizing group selected from the group consisting of sulfuric acid ester, phosphoric acid ester, phosphonic acid, phosphinic acid, hydroxyl, ether alcohol and polyether alcohol radicals.

5. An electroplating bath as in claim 1, wherein said hydrocarbon radical is an unsubstituted radical.

6. An electroplating bath as in claim 1, said hydrocarbon radical being a substituted radical.

7. The process of claim 3, wherein said hydrocarbon radical is an unsubstituted radical.

8. The process of claim 3, wherein said hydrocarbon radical is a substituted radical.

9. An electroplating bath as in claim 1, wherein R is an aliphatic radical with less than six carbon atoms.

10. An electroplating bath as in claim 1, wherein the salts of said organic compounds are selected from the group consisting of alkali metal salts and ammonium salts.

11. An electroplating bath as in claim 1, wherein said halogen atom is a bromine atom.

References Cited in the file of this patent
UNITED STATES PATENTS

| | | |
|---|---|---|
| 2,524,010 | DuRose et al. | Sept. 26, 1950 |
| 2,647,866 | Brown | Aug. 4, 1953 |